March 13, 1934.  T. C. FITZPATRICK  1,950,547
JUICE AND PULP EXTRACTOR
Filed April 30, 1932
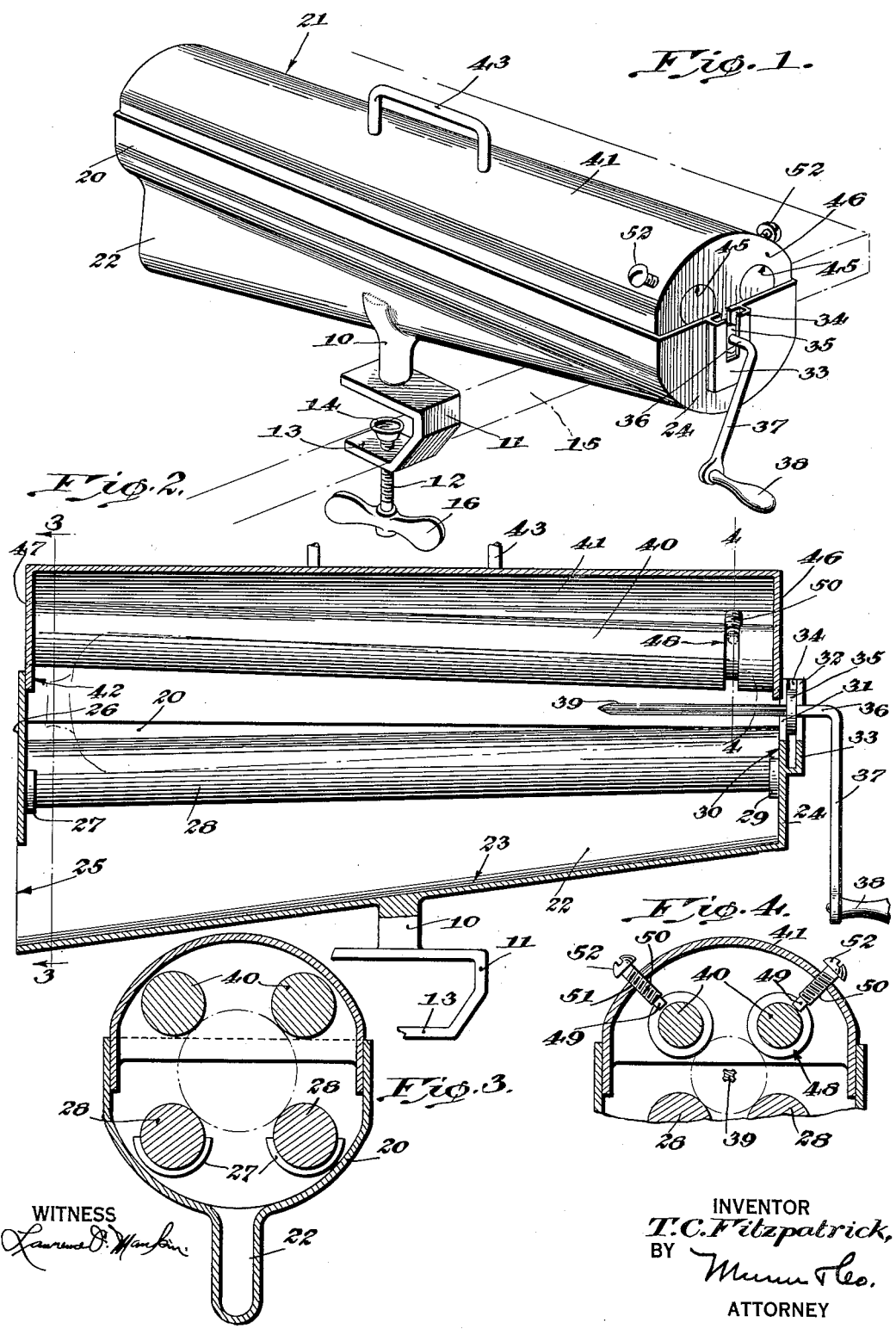
INVENTOR
T.C.Fitzpatrick,
BY
ATTORNEY Patented Mar. 13, 1934

1,950,547

UNITED STATES PATENT OFFICE 1,950,547

JUICE AND PULP EXTRACTOR

Thaddeus C. Fitzpatrick, Middlesboro, Ky.

Application April 30, 1932, Serial No. 608,526

1 Claim. (Cl. 146—4)

This invention relates to a device for expressing the juice and pulp from an ear of corn.

An object of the invention is the provision of a device for expressing milk and pulp from roasting ears of corn with facility, leaving the tough skin or husk of the grain attached to the cob and permitting utilization of corn of a later stage of maturity or hardness than is generally considered desirable for table use, the corn of such maturity being richer in flavor and nourishment than in the earlier stages.

A further object of the invention is the provision of a device for expressing juice and pulp from roasting ears and including a housing formed of a lower and an upper section provided with rollers progressively spaced apart in increasing distances to compensate for the varying widths of the corn, the corn being revolved manually, thereby causing the rollers to be automatically revolved for forcing the juice and pulp from the grains, the juice and pulp being collected by an inclined trough in communication with the bottom section or portion of the housing.

A further object of the invention is the provision of a device for expressing juices and pulp from the grains on an ear of corn in which tapered rollers are removably mounted in an upper and a lower section of a housing, the section being separately connected with means being employed for revolving an ear of corn supported between the pairs of rollers, the rollers being tapered throughout their length.

This invention will be best understood from a consideration of the following detailed description, in view of the accompanying drawing forming a part of the specification; nevertheless, it is to be understood that the invention is not confined to the disclosure, being susceptible of such changes and modifications which shall define no material departure from the salient features of the invention as expressed in the appended claim.

In the drawing:

Figure 1 is a view in perspective of a juice extractor constructed in accordance with the principles of my invention, Figure 2 is a longitudinal vertical section of the juice extractor, Figure 3 is a transverse vertical section taken along the line 3—3 of Figure 2, and Figure 4 is a fragmentary vertical section taken along the line 4—4 of Figure 2.

Referring more particularly to the drawing, 10 designates a post which is rigidly connected with a U-shaped clamping element 11 which is adapted to be inserted upon one end of a table. A screw 12 is threaded into an opening in the bottom 13 of the U-shaped member 11 and this screw between the legs of the U-shaped member is provided with a swivel cup-shaped member 14 adapted to engage the underface of a table top 15. A manipulating handle 16 is secured to the screw 12.

An elongated channel-shaped member 20 forms the lower section or portion of a housing, generally designated by the numeral 21. Depending from the section 20 is a trough-like member 22 which has a bottom portion 23 inclined downwardly from one end 24 to the opposite open end 25. The trough-like member 22 is considerably less in width than the width of the lower section 20. The bottom 23 is formed integrally or is connected to the post 10.

An end wall 25 of the section 20 is provided with semi-circular bearing members 27 which receive the end of tapered rollers 28. The opposite ends of these rollers are supported by semi-circular bearing members 29 carried by the opposite end wall 30 of the section 20.

The end 30 of the section 20 is provided with a slot 31 adapted to register with a slot 32 formed in the outer wall of a bearing box 33. This bearing box is provided with a channel member 34 adapted to receive a wheel 35 secured to a shaft 36. The wheel or disc 35 maintains the shaft 36 in position when the shaft is revolved by means of a crank 37 and a handle 38. The inner end of the shaft, as shown at 39, is pointed and adapted to be inserted axially of an ear of corn.

A pair of tapered rollers 40 are located within an upper housing 41 which has its lower edge, as shown at 42, seated within the upper end of the section 20. A handle 43 is secured to the outer face of the section 41 to provide means for raising or lowering the section or cover.

As shown at 45, the opposite ends 46 and 47 of the upper sections 41 is provided with passages to receive the ends of the rollers 40. These rollers 48 are provided with annular grooves to receive the inner free ends 49 of screws 50 threaded into openings 51 in the cover or upper section 41. These screws have wings 52 located externally of the upper section 41 to provide for ready manipulation of the screw during removal or replacement of the rollers 40. The projecting ends 49 of the screws 50 prevent the rollers from sliding through the openings in the end walls 46 and 47 of the upper section 41.

The rollers 28 and 40 are tapered and are slightly longer than the length of an ear of corn and they are spaced increasing distances along their length in order to conform to the tapering of an ear of corn.

An ear of corn is laid upon the rollers 28 and the sharpened portion 29 of the shaft 26 is forced into one end of the ear and the wheel or disc 35 is placed within the channels 34 of the box 33. The third or upper section 41 is then placed in position with the four rollers engaging the grains on the ear of corn.

When the handle 37 is revolved the ear will be revolved and due to the pressure which can be maintained upon the corn the juice and pulp will be forced out of the grains and will flow downwardly through the trough-like member 22 to be discharged at the opening 25.

I claim:

A juice and pulp extractor for ears of corn comprising a housing formed of a lower and an upper section, a pair of spaced rollers in each section mounted for rotation, the rollers being tapered throughout their length, the spacing between the rollers being progressively increased from one end of a section to the opposite end to conform generally to the tapering of an ear of corn, the opposite ends of the upper section being provided with passages to receive the ends of the rollers and forming bearings for said rollers, and means for rotatably supporting the rollers in position in the lower section, the supporting means having open portions to permit the ready removal of said rollers, the lower section being tapered inwardly below the supporting means to provide a downwardly inclined channel member to carry off the extracted juices.

THADDEUS C. FITZPATRICK.